United States Patent [19]

Hartman et al.

[11] Patent Number: 5,161,237
[45] Date of Patent: * Nov. 3, 1992

[54] DISPLAY DEVICE

[75] Inventors: Robert A. Hartman; Toru Sakai, both of Eindhoven, Netherlands

[73] Assignee: U.S. Philips Corporation, New York, N.Y.

[ * ] Notice: The portion of the term of this patent subsequent to Jul. 16, 2008 has been disclaimed.

[21] Appl. No.: 570,241

[22] Filed: Aug. 17, 1990

[30] Foreign Application Priority Data

Sep. 1, 1989 [NL] Netherlands .......................... 8902206

[51] Int. Cl.$^5$ .............................................. G02F 1/13
[52] U.S. Cl. ......................................... 359/54; 359/58; 359/60
[58] Field of Search ................... 350/339 R, 333, 334; 340/784; 359/58, 54, 60, 67

[56] References Cited

U.S. PATENT DOCUMENTS

| | | | |
|---|---|---|---|
| 4,653,862 | 3/1987 | Morozumi | 359/67 X |
| 4,666,252 | 5/1987 | Yaniv et al. | 350/333 |
| 4,709,992 | 12/1987 | Ueno | 350/339 R |
| 4,715,685 | 12/1987 | Yaniv et al. | 250/333 X |
| 4,776,673 | 10/1988 | Aoki et al. | 350/334 |
| 4,810,060 | 3/1989 | Ukai | 350/333 |
| 4,890,097 | 12/1989 | Yamashita | 340/784 X |
| 5,032,831 | 7/1991 | Kuijk | 340/784 |

FOREIGN PATENT DOCUMENTS

| | | | |
|---|---|---|---|
| 0299546 | 6/1987 | European Pat. Off. | 340/784 |
| 0380311 | 8/1990 | European Pat. Off. | 340/784 |
| 0031128 | 2/1989 | Japan | 340/784 |

*Primary Examiner*—Janice A. Howell
*Assistant Examiner*—Huy K. Mai
*Attorney, Agent, or Firm*—Bernard Franzblau

[57] ABSTRACT

A display device operating in accordance with the reset principle provides an array of pixels formed by an array of picture electrodes on the facing surfaces of two substrates with an electro-optical display medium therebetween. A matrix of row and column electrodes apply selection and data signals to the pixels and a system of auxiliary electrodes arranged parallel to the column electrodes apply an auxiliary voltage to the pixels prior to the selection signals. The picture electrodes are electrically coupled to the column electrodes and to the auxiliary electrodes via a plurality of first and second switching units, respectively. The first and second switching units are arranged perpendicular and parallel, respectively, to the column electrodes whereby artifacts are prevented while a larger effective surface area of the pixels is also obtained.

21 Claims, 3 Drawing Sheets

DISPLAY DEVICE

BACKGROUND OF THE INVENTION

This invention relates to a display device operating in accordance with a reset principle. The device comprises an electro-optical display medium between two supporting plates, a system of pixels arranged in rows and columns, with each pixel being constituted by picture electrodes arranged on the facing surfaces of the supporting plates, and a system of row and column electrodes for presenting selection and data signals by means of which a range of voltages dependent on the electro-optical display medium can be presented across the pixels for the purpose of picture display. The picture electrodes on one of the supporting plates are connected in an electrically conducting manner via a first switching unit to a column electrode for data signals, and via a second switching unit to an auxiliary voltage for applying auxiliary voltage across the pixels prior to selection, said auxiliary voltage lying beyond or on the limit of the range to be used for picture display.

A display device of this type is suitable for displaying alpha-numerical information and video information by means of passive electro-optical display media such as liquid crystals, electrophoretic suspensions and electrochromic materials.

A display device of the type described in the opening paragraph and operative in accordance with the reset principle is known from U.S. Pat. No. 5,032,831 (Jul. 16, 1991), and which is hereby incorporated by reference. In a device shown in this patent, diodes are used as non-linear switching elements in an active matrix. Two juxtaposed columns of pixels are connected via these diodes to an intermediate auxiliary voltage electrode for applying the auxiliary voltage, while the drive electrodes (column electrodes) are always arranged pairwise between two columns of pixels, offset over the width of a column with respect to the auxiliary voltage electrode. Therefore (apart from the space for the switching elements) space for one electrode or for two electrodes is left between successive columns of picture electrodes. This arrangement, with a spatial frequency of 2 rows of columns, has an unfavourable influence on the display due to the occurrence of so-called artifacts. This can be prevented by providing a black mask or black strips over the electrodes. However since the width of the black strips is determined by the largest distance which must be covered (in this case the space which is required for two column electrodes), these strips unnecessarily cover parts of the picture electrode at other areas.

Moreover, it is often desirable to provide black material at the area of the diodes. These diodes are usually made of amorphous silicon which has a larger leakage current under the influence of light. Without any special measures, a large part of the surface area of the display device is therefore lost for picture display.

OBJECTS AND SUMMARY OF THE INVENTION

It is one of the objects of the invention to provide a display device of the type described in the opening paragraph in which the surface area of the device is used to an optimum extent for picture display. It is based on the recognition that this can be achieved by choosing a suitable lay-out of the auxiliary voltage electrodes and column electrodes with respect to the picture electrodes.

To this end a display device according to the invention is characterized in that, viewed in a direction perpendicular to the supporting plates the longitudinal direction of the first switching unit is substantially perpendicular to the main direction of the column electrodes and the longitudinal direction of the second switching unit is substantially parallel to the main direction of the column electrodes.

It appears that the location of the switching elements can be chosen so that the widths of said black strips at the area of the column electrodes become substantially equal. As a result, the occurrence of artifacts is considerably reduced.

This is notably the case if the switching units comprise a plurality of non-linear switching elements such as, for example, diodes.

A preferred embodiment of a display device according to the invention is characterized in that two picture electrodes in two juxtaposed columns are offset substantially through half a pitch with respect to each other and in that the second switching units of the picture electrodes are located between these picture electrodes and the auxiliary voltage.

Such a device is suitable for color display by means of the so-called delta configuration for the three primary colors.

The auxiliary voltage electrode for applying the auxiliary voltage in this case preferably has a meandering or zig-zag variation.

BRIEF DESCRIPTION OF THE DRAWING

These and other aspects of the invention will now be described in greater detail, by way of example, with reference to some embodiments and the drawings in which:

FIG. 3 shows another embodiment, while

DESCRIPTION OF THE PREFERRED EMBODIMENT

Figure 1:
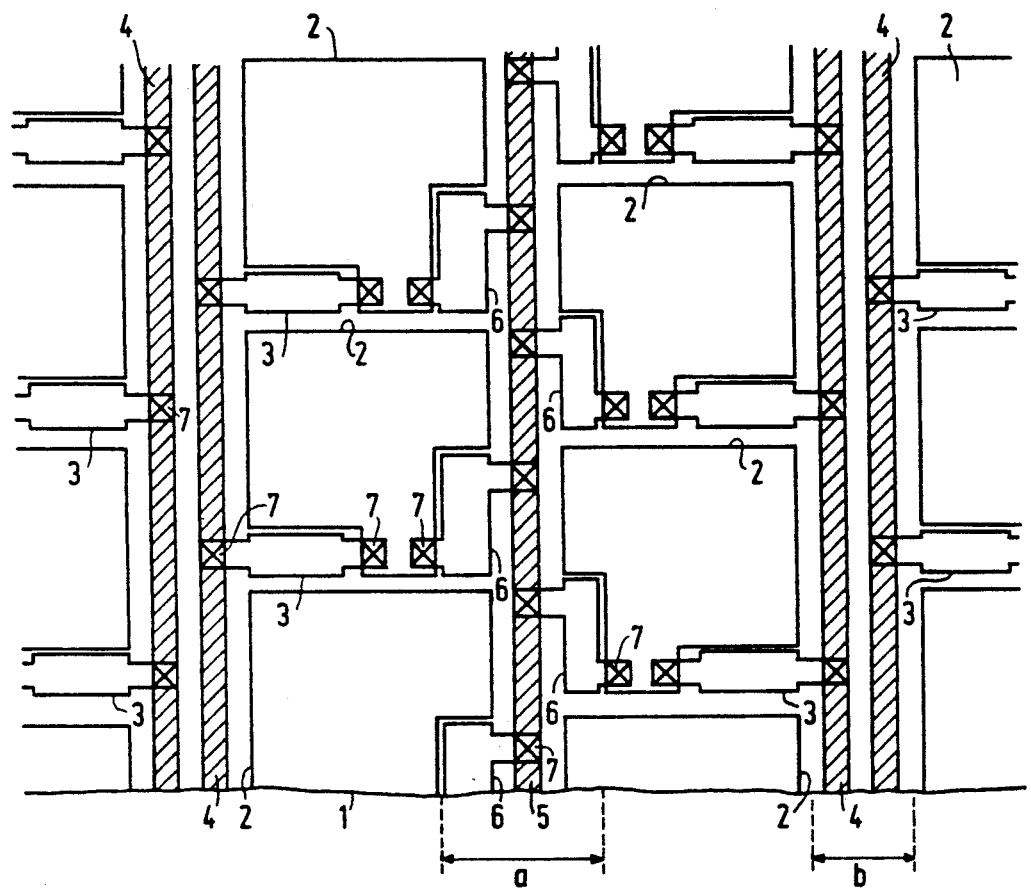
FIG. 1 is a diagrammatic plan view of part of a first embodiment of a display device according to the invention.

FIG. 1 is a plan view of a part of a supporting plate 1 which forms a part of a display device, for example, a liquid crystal display device. Picture electrodes 2 of, for example, indium-tin oxide are deposited on the supporting plate 1. These picture electrodes define pixels which are driven via switching units 3 shown diagrammatically. To this end, the switching units 3 are arranged between the picture electrodes 2 and column electrodes 4 which, together with a system of row electrodes, drive the pixels. The row electrodes are present on another supporting plate facing the supporting plate 1 and are constructed in such a way that they define said pixels together with the picture electrodes 2. The relevant device also comprises intermediate auxiliary voltage electrodes or voltage lines 5 for a applying an auxiliary voltage. The picture electrodes 2 are connected to these auxiliary voltage lines 5 via switching units 6 so that each pixel can be discharged or charged to a desired auxiliary voltage. The operation and drive mode of the display device is described in greater detail in the aforesaid U.S. Patent.

To be able to use the drive mode described in that patent, two column electrodes 4 then, one voltage line 5, then are alternately present between the columns of picture electrodes 2. This causes a variation of the width of parts of the display device which are not activated during use, which variation gives rise to so-called artifacts and which deteriorates the picture quality of pictures displayed by such display devices. To prevent this, both the column electrodes 4 and the auxiliary voltage lines 5 can be covered with a material which does not transmit light (on the supporting plate 1 or on the other supporting plate) in the form of strips having a substantially identical width. This width is determined by the largest width which is required, in this case the strip width which is required to cover two column electrodes 4 (and the intermediate space). However, strips having such a width also cover parts of the picture electrodes 2 at the area of the auxiliary voltage lines 5, which leads to a loss of effectively used surface area.

Moreover, the switching units 3, 6 are often realised in amorphous silicon. Larger leakage currents will start to flow in this material under the influence of light, which makes it necessary to shield these switching units from the light. When providing black material at the area of the switching units 3, 6 without taking special measures, the effective display area decreases even further.

According to the invention the switching units 6 are arranged in such a way that their longitudinal directions are located in the direction of the column electrodes 4. The switching units 6 are alternately arranged on the left and right-hand side of the auxiliary voltage line 5 between a picture electrode 2 and the voltage line 5. The longitudinal directions of the switching units 3 between column electrodes 4 and the picture electrodes 2 are arranged transversely to the column electrodes 4.

The contacts between the switching units 3, 6 and the electrodes 2 on the one hand and the column electrodes 4 and the voltage lines 5 on the other hand are shown diagrammatically in FIG. 1 by means of a cross 7.

Figure 2:
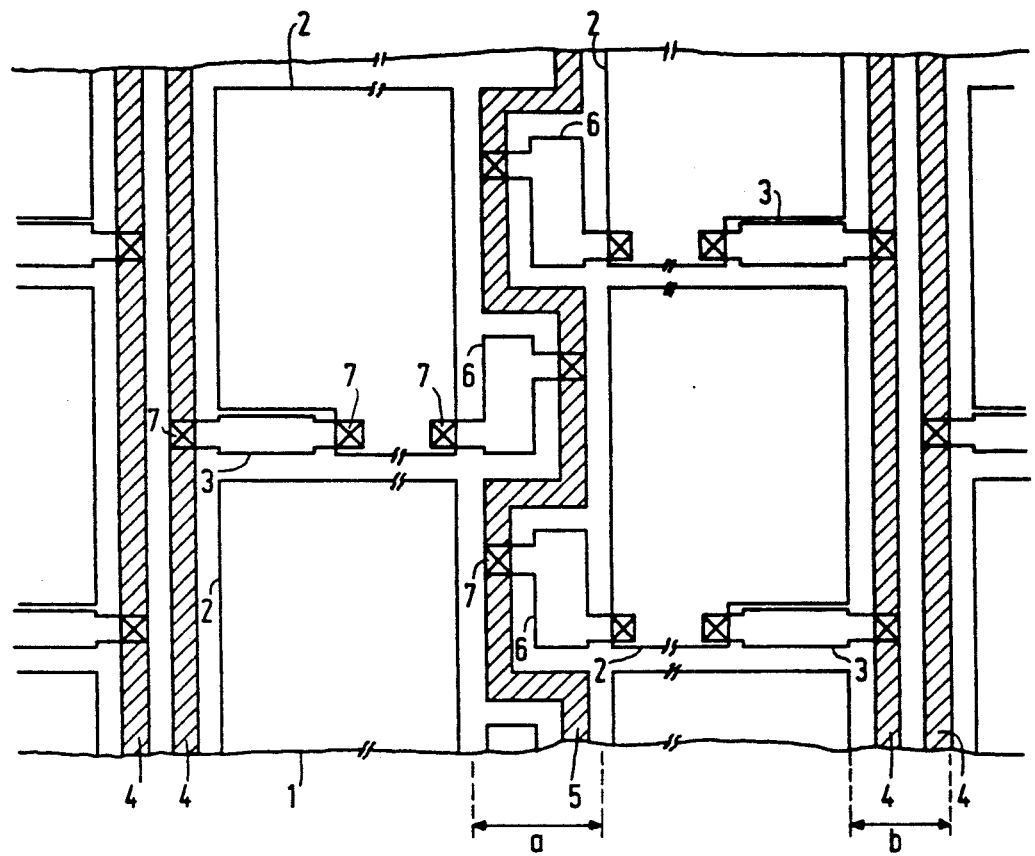
FIG. 2 shows a modification of the embodiment of FIG. 1

Possible strips of black material now have a width a at the area of the voltage line 5 and a width b at the area of the column electrode 4 denoted by broken lines. Although it is not quite clear due to the diagrammatic character of the drawing, a need not be larger or need hardly be larger than b in practice, even if the voltage line 5 meanders, as is shown in FIG. 2. The reference numerals in FIG. 2 denote the same elements as those in FIG. 1.

Even if the switching units 3, 6 are not very sensitive to light, the strips having widths a and b denoted by broken lines indicate regions which are not activated or are hardly activated during operation of the device. Since the widths a and b are substantially equal according to the invention, there is practically no irregularity in the picture in this case.

Figure 3:
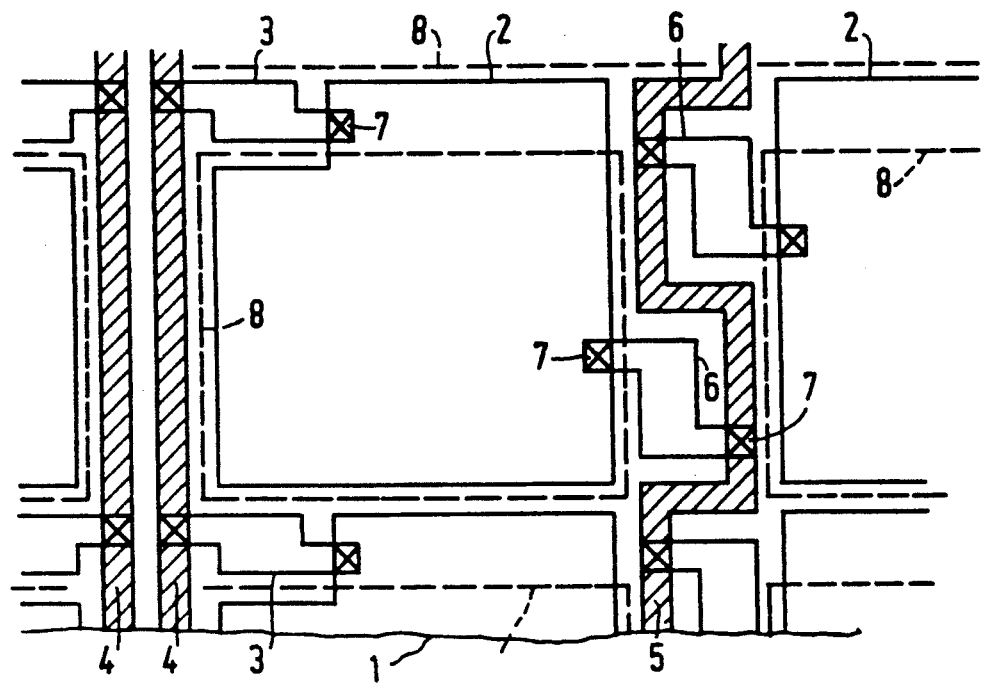

For, datagraphic display devices for example the pixels, instead of being offset through half a pitch with respect to each other, as is shown in FIGS. 1, 2 may be juxtaposed. This is shown in FIG. 3 in which the same reference numerals are used. The location of a possible black mask is denoted by means of broken lines 8.

Figure 4:
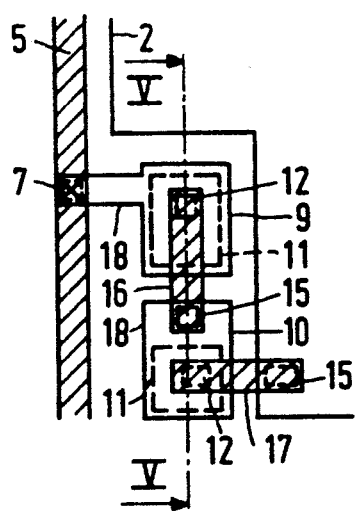
FIG. 4 is a diagrammatic plan view of a switching unit in greater detail.
Figure 5:
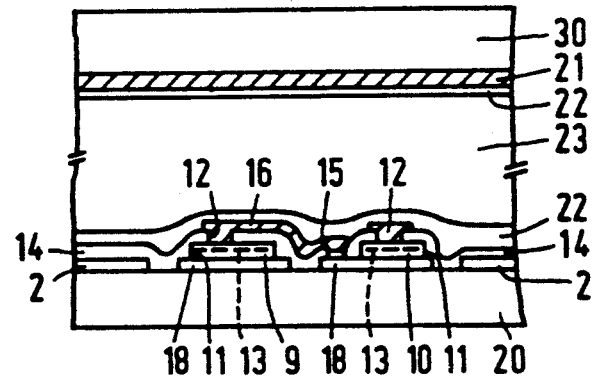
FIG. 5 is a diagrammatic cross-section taken on the line V—V in FIG. 4.

FIG. 4 is a diagrammatic plan view and FIG. 5 is a cross-section of a possible embodiment of a switching unit 6 located between a voltage line 5 and a pixel electrode 2. As part of an associated liquid crystal display device.

The switching unit 6 comprises, for example, two diodes 9, 10 for reasons of redundancy. In this embodiment the diodes 9, 10 are arranged in series so that the switching unit 6 will continue to function when one of the two diodes is short-circuited. The diodes may alternatively be arranged in parallel, while other combinations are also possible.

The diodes 9, 10 are realised in semiconductor regions 11 provided on a conducting material 18 (for example, indium-tin oxide), which regions are made of amorphous silicon, in which a pn junction 13 is shown to represent the diode function. The diode function may alternatively be realised by means of a Schottky contact by choosing a suitable material contacting the semiconductor regions 11 via contact holes 12 in a protective layer 14 of, for example, silicon nitride. The protective layer 14 is provided with contact holes 15 via which metallization strips 16, 17 are connected to the lower contact 18 of the diode 10 and the picture electrode 2, respectively.

The assembly is arranged (FIG. 5) on a glass supporting plate 20, which has the same function as the supporting plate 1 in FIGS. 1 to 3, while the picture display device also comprises a second supporting plate 30 provided with row electrodes 21. The pixels are defined by the facing picture electrodes 2 on the support plate 20 and the row electrodes 21 on the second support plate 30 in a manner similar to that shown in the aforesaid U.S. Pat. No. 5,032,831.

A layer 22 of orienting material, which also functions as a protective layer in this embodiment, is provided on the assembly and on the row electrodes 21. A layer 23 of liquid crystalline material is present between the two supporting plates.

Furthermore, the display device may be provided with polarizers and/or reflectors, dependent on its application and the liquid crystalline material used.

The invention is of course not limited to the embodiments shown, but several variations within the scope of the invention can be conceived by those skilled in the art. For example, the redundancy can be increased by means of a double form of the metallization strips 16, 17. Other electro-optical materials (electrophoretic, electrochromic materials) can alternatively be chosen instead of liquid crystal material.

We claim:

1. A display device comprising: an electro-optical display medium located between two supporting plates, a system of pixels arranged in rows and columns with each pixel comprising picture electrodes arranged on facing surfaces of the supporting plates, a system of row and column electrodes for presenting selection and data signals to the pixels by means of which a range of voltages dependent on the electro-optical display medium can be presented across the pixels to provide a picture display, a plurality of picture electrodes on one of the supporting plates being electrically connected via a first plurality of switching units to a column electrode for data signals and via a plurality of second switching units to an auxiliary voltage electrode for applying an auxiliary voltage across the pixels prior to selection, said auxiliary voltage lying beyond or on the limit of the range to be used for picture display, characterized in that, viewed in a direction perpendicular to the supporting plate, the longitudinal direction of the first switching units are substantially perpendicular to the main direction of the column electrodes and the longitudinal direction of the second switching units are substantially parallel to the main direction of the column electrodes.

2. A display device as claimed in claim 1, characterized in that each of said switching units comprises a plurality of non-linear switching elements.

3. A display device as claimed in claim 2, characterized in that picture electrodes in two juxtaposed columns are offset substantially through half a pitch with respect to each other, and in that the second switching units are located between said picture electrodes and the auxiliary voltage electrode.

4. A display device as claimed in claim 2, characterized in that, viewed in a direction perpendicular to the supporting plates, at least one of the supporting plates is provided with black material at the area of at least the switching units.

5. A display device as claimed in claim 2, characterized in that the non-linear switching elements comprise diodes.

6. A display device as claimed in claim 5, characterized in that two picture electrodes in two juxtaposed columns are offset in said main direction substantially through half a pitch with respect to each other, and in that the second switching units are located between said picture electrodes and the auxiliary voltage electrode.

7. A display as claimed in claim 1 characterized in that two picture electrodes in two juxtaposed columns are offset substantially through half a pitch with respect to each other, and in that the second switching units are located between said picture electrodes and the auxiliary voltage electrode.

8. A display device as claimed in cliam 7, characterized in that, viewed in a direction perpendicular to the supporting plates, at least one of the supporting plates is provided with black material at the area of at least the switching units.

9. A display device as claimed in claim 7, characterized in that the auxiliary voltage electrode has a meandering track.

10. A display device as claimed in claim 9, characterized in that, viewed in a direction perpendicular to the supporting plates, at least one of the supporting plates is provided with black material at the area of at least the switching units.

11. A display device as claimed in claim 1, characterized in that, viewed in a direction perpendicular to the supporting plates, at least one of the supporting plates is provided with black material at the area of at least the switching units.

12. A display device as claimed in claim 11, characterized in that the black material also extends to the area of the column electrodes and the auxiliary voltage electrode.

13. A display device as claimed in claim 1, characterized in that the electro-optical display medium comprises a liquid crystalline material.

14. A display device comprising:
an electro-optical display medium positioned between first and second substrates,
a plurality of picture electrodes arranged in a matrix of rows and columns on the first substrate and at least one picture electrode arranged on the second substrate so as to form with said display medium a matrix of pixels,
a system of row and column electrodes for applying selection and data voltage signals to the picture electrodes,
a system of auxiliary electrodes on the first substrate arranged parallel to the column electrodes for applying, prior to selection, an auxiliary voltage to the picture electrodes,
a plurality of first switching units electrically connecting the picture electrodes on one of the substrates to respective column electrodes for the data voltage signals, said first switching units having their longitudinal direction substantially perpendicular to their respective column electrodes,
a plurality of second switching units electrically connecting said picture electrodes on the one substrate to respective auxiliary electrodes, said second switching units being arranged with their longitudinal direction substantially parallel to their respective auxiliary electrodes.

15. A display device as claimed in claim 14 wherein at least one column of picture electrodes is positioned between first and second column electrodes on one side and one auxiliary electrode on its other side.

16. A display device as claimed in claim 15 wherein a plurality of the second switching units are alternately arranged on opposite sides of said one auxiliary electrode between the one auxiliary electrode and respective picture electrodes on either side of said one auxiliary electrode.

17. A display device as claimed in claim 14 wherein at least one auxiliary electrode is positioned between first and second adjacent columns of picture electrodes and second switching units are alternately arranged on opposite sides of said at least one auxiliary electrode proceeding in the longitudinal direction of the one auxiliary electrode and are located between the one auxiliary electrode and respective ones of the picture electrodes of said first and second adjacent columns of picture electrodes.

18. A display device as claimed in claim 17 wherein the picture electrodes in at least the first and second adjacent columns thereof are offset relative one another in the direction of the column electrodes.

19. A display device as claimed in claim 14 wherein the auxiliary electrodes have a zig-zag configuration while extending in a general parallel direction to the column electrodes.

20. A display device as claimed in claim 16 wherein at least one auxiliary electrode is located between first and second adjacent columns of picture electrodes and second switching units are alternately arranged on opposite sides of said one auxiliary electrode and between said one auxiliary electrode and respective picture electrodes of said first and second adjacent columns of picture electrodes.

21. A display device as claimed in claim 14 further comprising an opaque material on at least one of the substrates at the area of at least the switching units.

* * * * *